(12) United States Patent
McDermid

(10) Patent No.: US 10,459,482 B2
(45) Date of Patent: Oct. 29, 2019

(54) PROJECTED NEUTRAL BEND AXIS HINGE

(71) Applicant: William James McDermid, Niwot, CO (US)

(72) Inventor: William James McDermid, Niwot, CO (US)

(*) Notice: Subject to any disclaimer, the term of this patent is extended or adjusted under 35 U.S.C. 154(b) by 271 days.

(21) Appl. No.: 15/407,245

(22) Filed: Jan. 16, 2017

(65) Prior Publication Data

US 2017/0208699 A1 Jul. 20, 2017

Related U.S. Application Data

(60) Provisional application No. 62/279,476, filed on Jan. 15, 2016.

(51) Int. Cl.
*G06F 1/16* (2006.01)
*G09F 9/30* (2006.01)
*H04M 1/02* (2006.01)

(52) U.S. Cl.
CPC .......... *G06F 1/1616* (2013.01); *G06F 1/1652* (2013.01); *G06F 1/1681* (2013.01); *G09F 9/301* (2013.01); *H04M 1/0216* (2013.01); *H04M 1/0268* (2013.01); *Y10T 16/5475* (2015.01)

(58) Field of Classification Search
CPC .... G06F 1/1616; G06F 1/1652; G06F 1/1681; G09F 9/301; E05Y 2900/606; H04M 1/022; H04M 1/0216; H04M 1/0268; H05K 5/0226; Y10T 16/547; Y10T 16/5475; E05D 3/06; E05D 3/18

USPC .......... 16/366, 369; 379/433.13; 361/679.27; 455/575.3

See application file for complete search history.

(56) References Cited

U.S. PATENT DOCUMENTS

| | | | |
|---|---|---|---|
| 9,562,380 B2* | 2/2017 | Song | |
| 9,606,583 B2* | 3/2017 | Ahn ...................... G06F 1/1641 |
| 9,625,947 B2* | 4/2017 | Lee ........................ H04M 1/022 |
| 9,632,541 B2* | 4/2017 | Xin ........................ G06F 1/1681 |
| 9,668,570 B2* | 6/2017 | Mojtabavi ................ A47B 3/08 |
| 9,720,454 B2* | 8/2017 | Shi .......................... G06F 1/1681 |
| 9,851,759 B2* | 12/2017 | Tazbaz .................. G06F 1/1681 |
| 9,898,051 B2* | 2/2018 | Cho ....................... G06F 1/1616 |
| 10,073,496 B2* | 9/2018 | Chen ........................ E05D 3/06 |
| 10,162,389 B2* | 12/2018 | Tazbaz .................. G06F 1/1681 |
| 10,174,534 B2* | 1/2019 | Tazbaz ..................... E05D 3/14 |
| 10,209,743 B1* | 2/2019 | Hsu ....................... G06F 1/1681 |
| 10,234,907 B2* | 3/2019 | Knoppert .............. G06F 1/1681 |
| 2007/0097014 A1* | 5/2007 | Solomon ................ G06F 1/1616 345/1.1 |
| 2007/0117600 A1* | 5/2007 | Robertson, Jr. ..... H04M 1/0216 455/575.3 |
| 2014/0196254 A1* | 7/2014 | Song ........................ E05D 3/14 16/302 |
| 2016/0139634 A1* | 5/2016 | Cho ....................... G06F 1/1652 361/679.27 |
| 2019/0098783 A1* | 3/2019 | Zhang .................. H05K 5/0226 |

FOREIGN PATENT DOCUMENTS

KR 101505457 B1 * 3/2015

* cited by examiner

*Primary Examiner* — William L Miller

(57) ABSTRACT

A method and apparatus for folding a case along a hinge where the hinge is designed to project the neutral bend access of the fold to a layer affixed to an outer surface of the case.

16 Claims, 4 Drawing Sheets

PROJECTED NEUTRAL BEND AXIS HINGE

CROSS REFERENCE TO RELATED APPLICATIONS

This non-provisional application claims priority to U.S. provisional application 62/279,476 filed on Jan. 15, 2016, which is incorporated herein by reference.

BACKGROUND OF THE INVENTION

1. Field of the Invention

This invention relates to a method for folding an electronic device with a flexible display where the device case hinges such that the display experiences neither a tension nor compression force when the device is folded.

2. Statement of the Problem

It is convenient to be able to fold a mobile electronic device. Folding a tablet sized device, for example, would allow it to fit in a user's pocket. Folding displays are becoming possible with the advent of OLED displays processed on thin flexible substrates. These displays, however, are complex laminates comprised of numerous materials with varying elasticities. So, though they can bend, they are not easily compressed and stretched. When a laminate is bent, there is a neutral bend axis where the material experiences neither a compression nor a tension stress. The material outside this axis experiences tension stresses while the material inside this axis experiences compression stresses. It is preferable for this neutral bend axis be reserved for the layer in the display least able to withstand these stresses.

It is often desirable for the display on a mobile device to be mounted to a case that can act as a base for the display and contain electronics, batteries, and the like. To be able to fold the device, the case will require a hinge. Traditional hinges contain the neutral bend axis, thus causing tension or compression stress in the display mounted to the case as the device is folded.

SUMMARY OF THE SOLUTION

The present invention solves the above and other problems with a hinge that is able to project the neutral bend axis to a location above or below it.

ASPECTS

An aspect of the invention is how the hinge is comprised of two hinge layers where each hinge layer is comprised of two or more segments connected end to end with hinge pins, and where each hinge layer contains the same number segments, and where each segment in the first hinge layer is paired with a segment in the second hinge layer, and where the center point of the pared segments are tied together, and where the length of the segments on the first layer can be varied and the length of the segments in the second hinge layer can be varied.

Another aspect of the invention is how the hinge lays flat when the lengths of the segments in the first hinge layer are equal to the length of the segments in the second hinge layer.

Another aspect of the invention is how the hinge curls towards the first hinge layer when the length of the segments in the first hinge layer are less than the length of the segments in the second hinge layer. Likewise, the hinge curls towards the second hinge layer when the length of the segments in the first hinge layer are greater than the lengths of the segments in the second hinge layer.

Another aspect of the invention is how the length of an arc swept by the hinge can be increased and decreased by proportionately increasing and decreasing the lengths of the segments in the first and second hinge layers.

Another aspect of the invention is how the degrees of the bend formed by the hinge can be increased and decreased by increasing and decreasing the lengths of the segments in one hinge layer with respect to the lengths of the segments in the other hinge layer.

Another aspect of the invention is how the lengths of the segments in the first hinge layer and the lengths of the segments in the second hinge layer can be varied to cause the hinge to open and close while keeping the neutral bend axis a set distance from the hinge pins connecting the segments in the first hinge layer.

Another aspect of the invention is how each hinge segment is comprised of a pair of cross ties where the length of the segment is varied by varying the angle between the cross ties, and where adjacent cross ties within each hinge layer can be tied together so the lengths of the segments within a hinge layer remain equal as they increase and decrease.

Alternatively, each hinge segment is comprised of parallel hinge leaves where the length of the segment is varied by sliding the hinge leaves relative to one another.

Another aspect of the invention is how a device can be comprised of any number of case pieces (n) connected by (n−1) hinges

DESCRIPTION OF THE DRAWINGS

The above and other advantages and features of the invention may be better understood from a reading of the detailed description taken in conjunction with the drawings. The same reference number represents the same element on all drawings.

DETAILED DESCRIPTION OF THE INVENTION

FIGS. 1-4 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figures 1A, 1B, 1C:
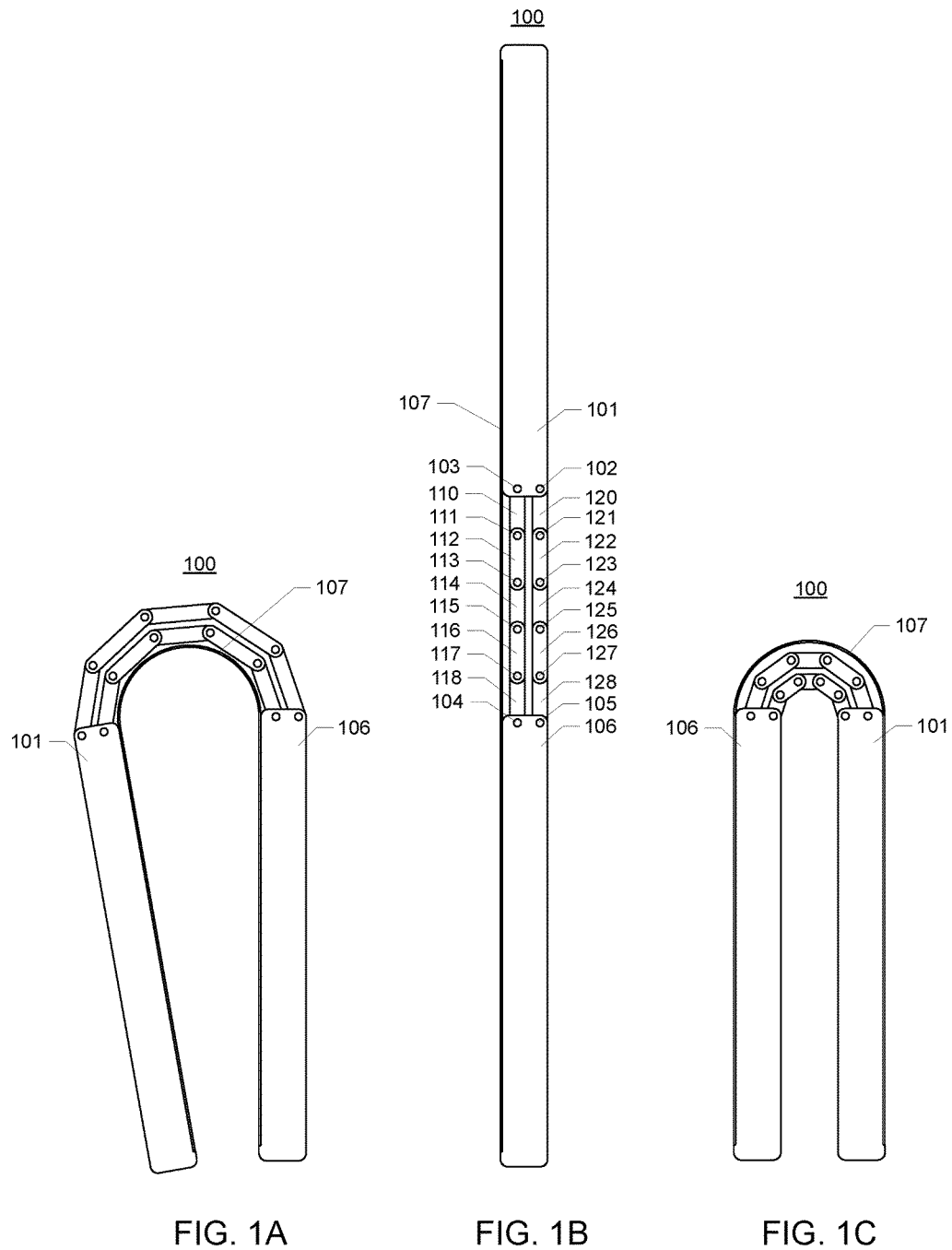
FIG. 1A is a side view of a bi-folding device where the neutral bend axis is inside the angle formed by the hinge.
FIG. 1B is a side view of a bi-folding device when the hinge is lying flat.
FIG. 1C is a side view of a bi-folding device where the neutral bend axis is outside the angle formed by the hinge.

FIG. 1 shows three folding configurations of device 100: in FIG. 1A device 100 is folded with the neutral bend axis is inside the angle formed by the hinge, in FIG. 1B device 100 is not folded so there is no bend and in FIG. 1C device 100 is folded with the neutral bend axis outside the angle formed by the hinge.

The bi-folding device 100 consists of a display laminate 107 covering two case enclosure pieces 101 and 106 connected by two hinge layers where each layer is comprised of five link segments. Each link segment within the first hinge layer is paired with a link segment in the second hinge layer. For example, link segment 110 is paired with link segment 120. The link segments are constructed in a manner that allows them to expand and contract. In a preferred embodiment, all the link segments within the first hinge layer are the same length and all the segments within the second hinge layer are the same length.

The link segments within a hinge layer are connected to one another and the case pieces at hinge pins. For example, link segment 110 is connected to link segment 112 via hinge pin 111. These hinge pins allow the segments to rotate relative to one another.

The paired link segments between hinge layers are tied together at the links' center points.

The ability of the links to expand and contract combined with their ability to rotate, allow the hinge to open and close while keeping display 107 on the neutral bend axis.

Figure 2A:
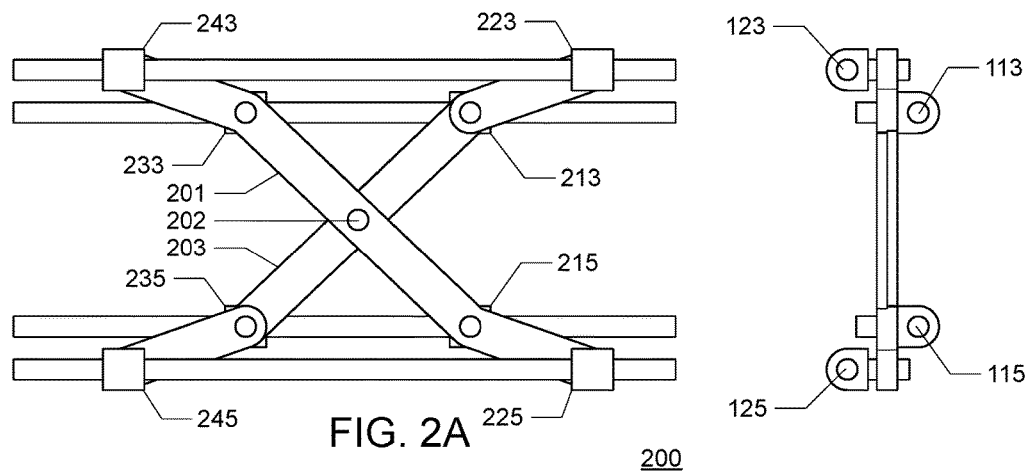
FIG. 2A is a top view of a cross tie assembly between two adjacent pairs of hinge pins when the bi-folding device is folded so the neutral bend axis is inside the angle formed by the hinge.
Figure 2B:
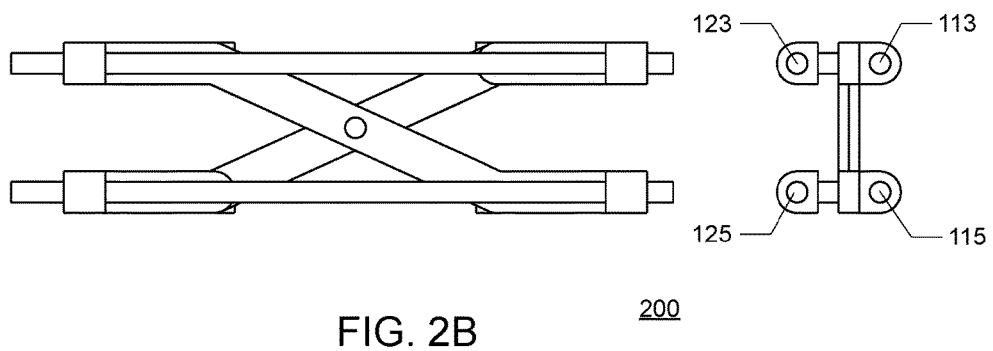
FIG. 2B is a top view of a cross tie assembly between two adjacent pairs of hinge pins when the bi-folding device is lying flat.
Figure 2C:
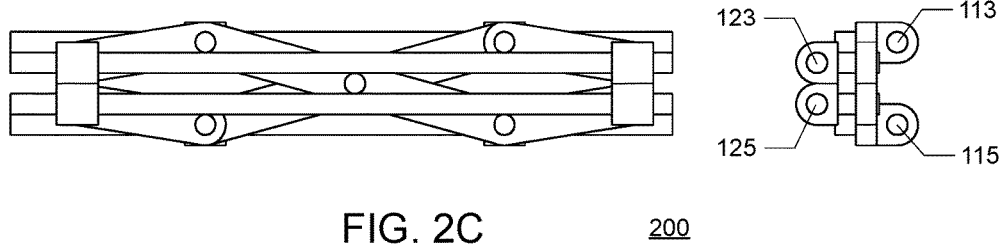
FIG. 2C is a top view of a cross tie assembly between two adjacent pairs of hinge pins when the bi-folding device is folded so the neutral bend axis is outside the angle formed by the hinge.

FIG. 2 shows the top and end views of a link represented by link pair 114/124. It shows the details of the mechanism in three different states. FIG. 2A shows the mechanism where the neutral bend axis would be inside the angle formed by the hinge. FIG. 2B shows the mechanism where the hinge lays flat so there is no bend. FIG. 2C shows the mechanism where the neutral bend axis would be outside the angle formed by the hinge.

In this embodiment, each link pair is implemented as a single link mechanism 200. Link mechanism 200 consists of two cross ties 201 and 203 connected at pivot point 202, and eight sleeves that connect it to four hinge pins. The cross tie is connected to each hinge pin via two sleeves. The geometry of the link mechanism allows the distance between the hinge pins in each hinge layer to expand and contract where the relationship of the first layer distance to the second layer distance follows a deterministic function.

Figure 3A:
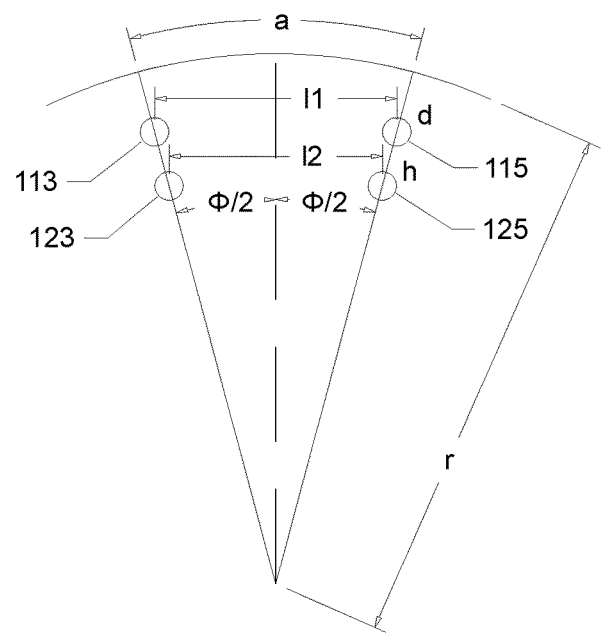
FIG. 3A is a simplified side view of two adjacent pairs of hinge pins where the neutral bend axis is outside the angle formed by the hinge.
Figure 3B:
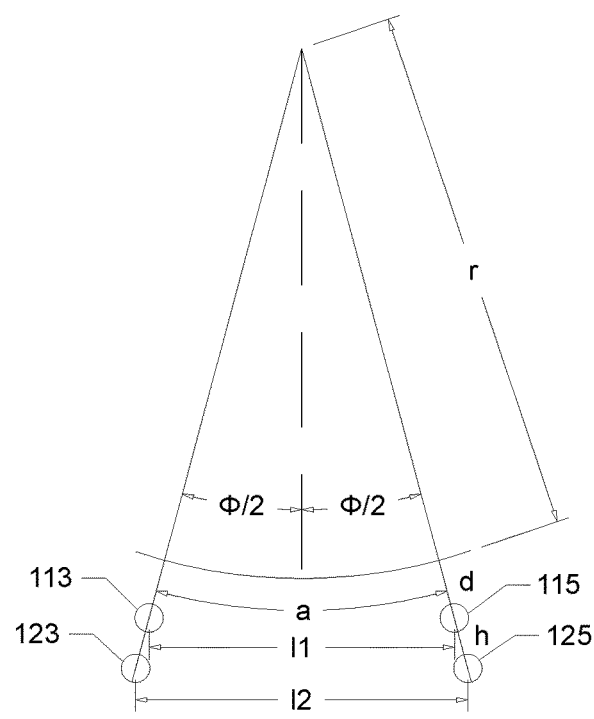
FIG. 3B is a simplified side view of two adjacent pairs of hinge pins where the neutral bend axis is inside the angle formed by the hinge.

FIG. 3A shows a representation of link pair 114/124 when the neutral bend axis is outside the angle formed by the hinge. FIG. 3A shows a representation of link pair 114/124 when the neutral ben axis is outside the angle formed by the hinge. As can be derived from these diagrams, if $\Phi$ is the total angle of the case bend divided by the number of segment pairs, h is the fixed distance between paired pivot hinge pins, d is a defined gap between the hinge mechanism and the neutral bend axis, a is the length of the arc swept out over the link segment on the neutral bend axis, r is the radius of the arc, l1 is the distance between the hinge pin pairs on hinge layer 1, and l2 is the distance between the pivot hinge pin pairs on hinge layer 2, then $$l1 = 2 \cdot (r-d) \cdot \sin(\Phi/2) \text{ and}$$

$$l2 = 2 \cdot (r-d-h) \cdot \sin(\Phi/2) \text{ for FIG. 3A}$$

$$l1 = 2 \cdot (r+d) \cdot \sin(\Phi/2) \text{ and}$$

$$l2 = 2 \cdot (r+d+h) \cdot \sin(\Phi/2) \text{ for FIG. 3B}$$

$$a/2\pi r = \Phi/2\pi$$

Along the neutral bend axis there is no stretching or compressing so "a" is held constant. Thus "r" will vary as "$\Phi$" varies. Rearranging and substituting yields:

$$l1 = 2 \cdot (a/\Phi - d) \cdot \sin(\Phi/2) \text{ and}$$

$$l2 = 2 \cdot (a/\Phi - d - h) \cdot \sin(\Phi/2) \text{ for FIG. 3A}$$

$$l1 = 2 \cdot (a/\Phi + d) \cdot \sin(\Phi/2) \text{ and}$$

$$l2 = 2 \cdot (a/\Phi + d + h) \cdot \sin(\Phi/2) \text{ for FIG. 3B}$$

Figure 4A:
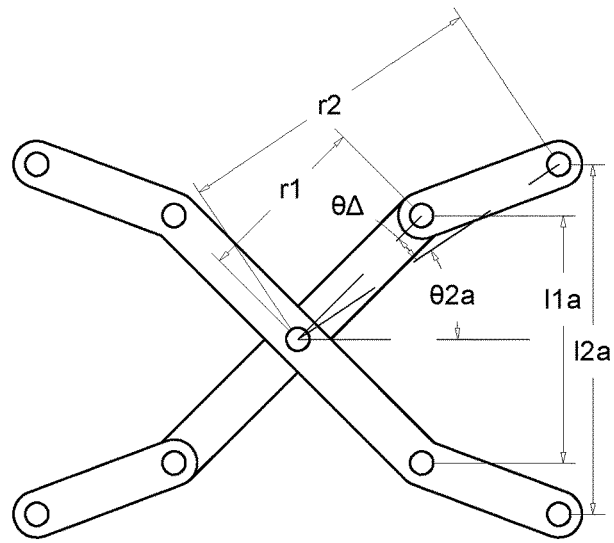
FIG. 4A is a simplified top view of the cross ties when the bi-folding device is folded so the neutral bend axis is inside the angle formed by the hinge.
Figure 4B:
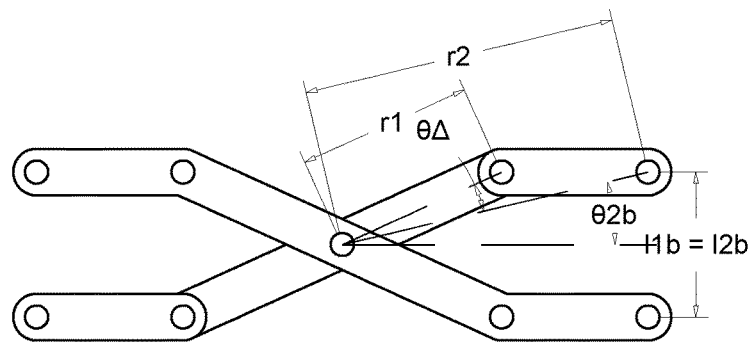
FIG. 4B is a simplified top view of the cross ties when the bi-folding device is lying flat.
Figure 4C:
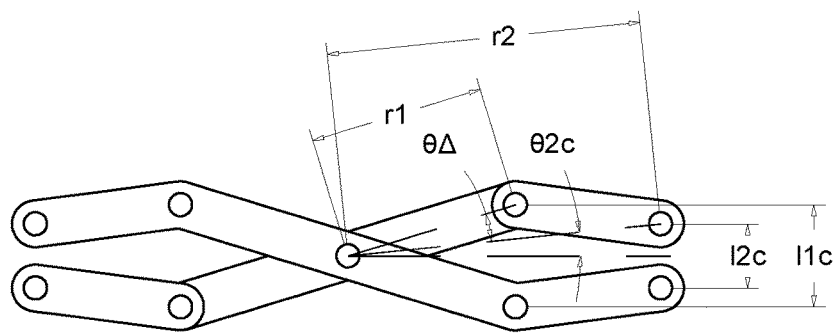
FIG. 4C is a simplified top view of the cross ties when the bi-folding device is folded so the neutral bend axis is outside the angle formed by the hinge.

FIG. 4 shows a representation of link pair 114/124 in various states. As can be derived from these diagrams:

$$l1 = 2 \cdot r1 \cdot \sin \theta 2$$

$$l2 = 2 \cdot r2 \cdot \sin(\theta 2 + \theta \Delta)$$

where r1, r2, and $\theta\Delta$ are fixed based on the design of the cross tie.

The table of calculations below show a design example where carefully selected values for "do", "r1", and "r2" based on given design specifications will keep the display on the neutral bend axis as the case is folded by varying $\theta 2$.

| Design Specifications | |
|---|---|
| Minimum bend radius | 7.500 mm |
| Maximum bend angle | 190.000° |
| Number of links | 5 |
| Distance between paired pivots (h) | 2.400 mm |
| Distance from hinge to inside neutral bend axis (di) | 1.700 mm |
| Selected Values | |
| Distance from hinge to outside neutral bend axis (do) | 1.535 mm |
| Cross tie radius to hinge layer 1 (r1) | 5.000 mm |
| Cross tie radius to hinge layer 2 (r2) | 11.058 mm |
| Calculated Values | |
| Arc length (a) (calculate when $\Phi$ = maximum bend angle) | 4.974 mm |
| Cross tie angle delta ($\theta\Delta$) (calculate when $\Phi$ = 0 | 16.832° |

| Total Bend Angle° | Φ° | Target 11 mm | Target 12 mm | θ1° | θ2° | Actual 11 mm | Actual 12 mm | d error mm |
|---|---|---|---|---|---|---|---|---|
| −190 | −38 | 3.884 | 2.322 | 22.857 | 6.026 | 3.884 | 2.322 | 0.000 |
| −180 | −36 | 3.944 | 2.461 | 23.231 | 6.399 | 3.944 | 2.465 | 0.005 |
| −170 | −34 | 4.004 | 2.601 | 23.605 | 6.773 | 4.004 | 2.608 | 0.010 |
| −160 | −32 | 4.064 | 2.741 | 23.978 | 7.146 | 4.064 | 2.751 | 0.014 |
| −150 | −30 | 4.123 | 2.881 | 24.351 | 7.519 | 4.123 | 2.894 | 0.019 |
| −140 | −28 | 4.182 | 3.021 | 24.723 | 7.892 | 4.182 | 3.037 | 0.023 |
| −130 | −26 | 4.241 | 3.161 | 25.095 | 8.264 | 4.241 | 3.179 | 0.028 |
| −120 | −24 | 4.300 | 3.302 | 25.466 | 8.635 | 4.300 | 3.320 | 0.032 |
| −110 | −22 | 4.358 | 3.442 | 25.837 | 9.005 | 4.358 | 3.462 | 0.037 |
| −100 | −20 | 4.416 | 3.583 | 26.206 | 9.375 | 4.416 | 3.602 | 0.041 |
| −90 | −18 | 4.474 | 3.723 | 26.575 | 9.743 | 4.474 | 3.743 | 0.046 |
| −80 | −16 | 4.531 | 3.863 | 26.942 | 10.111 | 4.531 | 3.882 | 0.050 |
| −70 | −14 | 4.588 | 4.003 | 27.308 | 10.477 | 4.588 | 4.022 | 0.054 |
| −60 | −12 | 4.644 | 4.143 | 27.673 | 10.842 | 4.644 | 4.160 | 0.058 |
| −50 | −10 | 4.700 | 4.282 | 28.037 | 11.205 | 4.700 | 4.298 | 0.062 |
| −40 | −8 | 4.756 | 4.421 | 28.399 | 11.567 | 4.756 | 4.435 | 0.066 |
| −30 | −6 | 4.811 | 4.560 | 28.759 | 11.928 | 4.811 | 4.571 | 0.071 |
| −20 | −4 | 4.866 | 4.699 | 29.118 | 12.286 | 4.866 | 4.706 | 0.075 |
| −10 | −2 | 4.920 | 4.837 | 29.475 | 12.643 | 4.920 | 4.841 | 0.079 |
| 0 | 0 | 4.974 | 4.974 | 29.829 | 12.998 | 4.974 | 4.974 | 0.000 |
| 10 | 2 | 5.033 | 5.117 | 30.220 | 13.389 | 5.033 | 5.121 | 0.078 |
| 20 | 4 | 5.092 | 5.259 | 30.609 | 13.778 | 5.092 | 5.267 | 0.074 |
| 30 | 6 | 5.150 | 5.401 | 30.997 | 14.165 | 5.150 | 5.412 | 0.070 |
| 40 | 8 | 5.207 | 5.542 | 31.381 | 14.550 | 5.207 | 5.556 | 0.065 |
| 50 | 10 | 5.264 | 5.683 | 31.764 | 14.932 | 5.264 | 5.699 | 0.061 |
| 60 | 12 | 5.320 | 5.822 | 32.144 | 15.312 | 5.320 | 5.840 | 0.056 |
| 70 | 14 | 5.376 | 5.961 | 32.522 | 15.690 | 5.376 | 5.981 | 0.052 |
| 80 | 16 | 5.431 | 6.099 | 32.896 | 16.065 | 5.431 | 6.120 | 0.048 |
| 90 | 18 | 5.486 | 6.237 | 33.269 | 16.437 | 5.486 | 6.258 | 0.043 |
| 100 | 20 | 5.539 | 6.373 | 33.638 | 16.806 | 5.539 | 6.394 | 0.039 |
| 110 | 22 | 5.592 | 6.508 | 34.004 | 17.172 | 5.592 | 6.530 | 0.035 |
| 120 | 24 | 5.645 | 6.643 | 34.366 | 17.535 | 5.645 | 6.663 | 0.030 |
| 130 | 26 | 5.696 | 6.776 | 34.725 | 17.894 | 5.696 | 6.795 | 0.026 |
| 140 | 28 | 5.747 | 6.909 | 35.081 | 18.250 | 5.747 | 6.926 | 0.022 |
| 150 | 30 | 5.798 | 7.040 | 35.433 | 18.602 | 5.798 | 7.055 | 0.017 |
| 160 | 32 | 5.847 | 7.170 | 35.781 | 18.950 | 5.847 | 7.182 | 0.013 |
| 170 | 34 | 5.896 | 7.299 | 36.126 | 19.294 | 5.896 | 7.308 | 0.009 |
| 180 | 36 | 5.943 | 7.427 | 36.466 | 19.634 | 5.943 | 7.431 | 0.004 |
| 190 | 38 | 5.990 | 7.553 | 36.802 | 19.970 | 5.990 | 7.553 | 0.000 |

The error shown in the last column is easily accommodated by an elastomer layer that fills the gap and smooths the discontinuities between the hinge mechanism and the display laminate. Because this elastomer is not on the neutral bend axis, it is selected based on its Poisson ratio to match the reduction in the gap from "di" when the elastomer is compressed, to "do" when the elastomer is stretched.

Although specific embodiments were described herein, the scope of the invention is not limited to those specific embodiments. The scope of the invention is defined by the following claims and any equivalents therein.

I claim:

1. A method for folding a device along a hinge connecting two case pieces that projects the neutral bend axis to a flexible layer mounted on an outer surface of the case pieces wherein the hinge is comprised of two hinge layers, wherein each hinge layer is comprised of one or more link segments, wherein the link segments within each hinge layer are connected to one another and the case pieces at hinge pins, wherein each hinge layer contains the same number of link segments, wherein each segment in the first hinge layer is paired with a link segment in the second hinge layer, wherein the relative location of the center points of paired link segments is held constant, and wherein the lengths of the link segments in the first hinge layer can be varied and the length of the link segments in the second hinge layer can be varied, such that the flexible layer experiences neither a tension nor compression force when the device is folded.

2. The method of claim 1 where the hinge lays flat when the length of the link segments in the first hinge layer are equal to the length of the link segments in the second hinge layer.

3. The method of claim 1 where the hinge curls towards the first hinge layer when the length of the link segments in the first hinge layer are less than the length of the link segments in the second hinge layer.

4. The method of claim 1 where the hinge curls towards the second hinge layer when the length of the link segments in the first hinge layer are greater than the length of the link segments in the second hinge layer.

5. The method of claim 1 where the length of an arc swept by the hinge can be increased and decreased by increasing and decreasing the length of the link segments in the first and second hinge layers by a proportional amount.

6. The method of claim 1 where the length of the link segments in the first hinge layer and the length of the link segments in the second hinge layer can be varied to cause the hinge to open and close while keeping the neutral bend axis a set distance from the hinge pins in the first hinge layer.

7. The method of claim 1 where all link segments are comprised of cross ties where the length of the link segment is varied by varying the angles between the cross ties.

8. The method of claim 7 where the cross ties of paired link segments on the two hinge layers share a common pivot point and have a fixed relationship determined so the length of the link segments in the first hinge layer and the length of the segments on the second hinge layer are varied as the hinge opens and closes to keep the neutral bend axis a fixed distance from the hinge pins on the first hinge layer.

9. An apparatus that folds along a hinge connecting two case pieces that projects the neutral bend axis to a flexible layer mounted on an outer surface of the case pieces, wherein the hinge is comprised of two hinge layers, wherein each hinge layer is comprised of one or more link segments, wherein the link segments within each hinge layer are connected to one another and the case pieces at hinge pins, wherein each hinge layer contains the same number of link segments, wherein each link segment in the first hinge layer is paired with a link segment in the second hinge layer, wherein the relative location of the center points of paired link segments is held constant, and wherein the length of the link segments in the first hinge layer can be varied and the length of the link segments in the second hinge layer can be varied, such that the flexible layer experiences neither a tension nor compression force when the apparatus is folded.

10. The apparatus of claim 9 where the hinge lays flat when the length of the link segments in the first hinge layer are equal to the length of the link segments in the second hinge layer.

11. The apparatus of claim 9 where the hinge curls towards the first hinge layer when the length of the link segments in the first hinge layer are less than the length of the link segments in the second hinge layer.

12. The apparatus of claim 9 where the hinge curls towards the second hinge layer when the length of the link segments in the first hinge layer are greater than the lengths of the link segments in the second hinge layer.

13. The apparatus of claim 9 where the length of an arc swept by the hinge can be increased and decreased by increasing and decreasing the length of the link segments in the first and second hinge layers by a proportional amount.

14. The apparatus of claim 9 where the length of the link segments in the first hinge layer and the length of the link segments in the second hinge layer can be varied to cause the hinge to open and close while keeping the neutral bend axis a set distance from the hinge pins in the first hinge layer.

15. The apparatus of claim 9 where all link segments are comprised of cross ties where the length of the link segments are varied by varying the angles between the cross ties.

16. The apparatus of claim 15 where the cross ties of paired link segments on the two hinge layers share a common pivot point and have a fixed relationship determined so the length of the link segments in the first hinge layer and the length of the segments in the second hinge layer are varied as the hinge opens and closes to keep the neutral bend axis a fixed distance from the hinge pins on the first hinge layer.

* * * * *